United States Patent Office 3,303,221
Patented Feb. 7, 1967

3,303,221
PROCESS FOR PREPARING HALOETHERS
Ronald E. Gilbert and Nicholas B. Lorette, Lake Jackson, Tex., assignors to The Dow Chemical Company, Midland, Mich., a corporation of Delaware
No Drawing. Filed Nov. 3, 1961, Ser. No. 149,864
10 Claims. (Cl. 260—611)

This invention relates to a process for preparing certain organic haloethers. Specifically, the invention relates to the preparation of haloalkyl, haloallyl and halobenzyl ethers having the respective formulae:

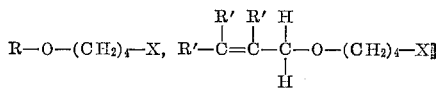

and

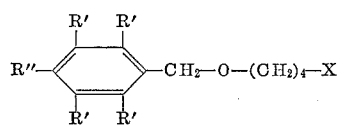

wherein X is selected from the group consisting of chlorine and bromine; R is a primary alkyl radical having from one to six carbon atoms; R' is selected from the group consisting of alkyl radicals having from one to three carbon atoms, hydrogen, chlorine and bromine; and R'' is selected from the group consisting of alkyl radicals having from one to three carbon atoms, chlorine and bromine.

The process of the present invention is conveniently practiced and the haloalkyl, haloallyl and halobenzyl ethers are prepared by contacting, and thereby effecting reaction of, tetrahydrofuran with an alkyl halide, an allylic halide or a benzylic halide, respectively, having the formulae:

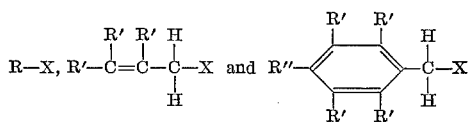

wherein X, R, R' and R'' have the significance as hereinbefore stated. It is essential to include, as a third component in the reaction mixture, a catalytic amount of an inorganic salt belonging to the group commonly referred to as Friedel-Craft catalysts; examples of such salts that may be used in this process include zinc chloride, aluminum chloride, aluminum bromide, ferric chloride, and boron trifluoride. At the conclusion of the reaction, the desired product may be separated from the reaction mixture by known techniques; distillation is a convenient method for such separation.

It is a further essential that the benzyl compound used as a reactant in the above process be substiuted by an alkyl radical or halogen in the para position. A para-unsubstituted benzyl compound will react to form an undesired polymeric substance. Suitable temperatures for the process are from about 25° C. to about 200° C. and preferably about 50 to 175° C. Autogenous pressures are conveniently utilized in carrying out the process.

The molar ratio of tetrahydrofuran to organic halide used is suitably from about 0.5:1 to about 10:1 with a ratio of about 2:1 being preferred.

The products of the present invention are useful as solvents for polymers, particularly polyolefins; hydrogenation of the alkenyl ethers produces the corresponding saturated compounds, one of which—4-chlorobutyl propyl ether—is active against coccidiosis in fowls. The trans-3-chloroallyl 4-chlorobutyl ether is herbicidally active on certain plant species, for example, peas, pigweeds, Japanese millet and meadow fescue. The same compound is also active against the white mouse and the Northern fat-headed minnow.

The practice of the present invention is illustrated by the following examples.

Example 1

450 grams (6.2 moles) of tetrahydrofuran, 320 grams of allyl chloride and 27 grams of zinc chloride were mixed and refluxed for several days. During the reflux period the temperature gradually increased from 59° C. to 68° C. At the conclusion of the reaction the crude product was washed four times with water, each portion of water being of slightly larger volume than the product, and the product was then dried using sodium sulfate. The dried product was then distilled, first at atmospheric pressure where 198 grams of allyl chloride were recovered, and then at 4.5 mm. pressure where 157 grams (1.06 moles) of allyl 4-chlorobutyl ether were recovered, representing a yield of 70 percent based on the converted allyl chloride. This ether had $n_D^{24}$ of 1.4410 and $d_{24}$ of 0.966 g./ml.

Example 2

In a manner similar to that of Example 1, 2 moles of tetrahydrofuran, 1 mole of allyl chloride, and 2.87 g. of zinc chloride were mixed together in each of a series of experiments. The reactions were run for two hours at different temperatures to determine its effect on the reaction. The temperature, conversion of allyl chloride and percent yield based on that conversion are shown in Table I.

TABLE I

| Experiment | Temperature of Reaction | Conversion Allyl Chloride | Percent Yield of Allyl 4-Chlorobutyl-ether |
|---|---|---|---|
| A | 125 | 8 | 75 |
| B | 155 | 23 | 69.7 |
| C | 175 | 31 | 55 |

A subsantially identical result was obained when ferric chloride was used in place of zinc chloride as the catalyst in Part A of the above example.

Example 3

In an experiment similar to Example 1, allyl bromide was used in place of allyl chloride. Thus, 6 moles of tetrahydrofuran, 3 moles of allyl bromide, and 28 g. of $ZnCl_2$ were mixed and refluxed for 64 hours, during which time the temperature of the mixture rose from 70° C. to 80° C. A water wash of the reaction mixture and a flash distillation gave 0.66 mole of allyl 4-bromobutyl ether. Physical properties of the pure product were: $n_D^{23}$ 1.4658, $d_{23}$ 1.23 g./ml., $b_{6\ mm.}$ 68°.

Examples 4–7

In a similar manner to that in Example 1, three other organic halides within the scope of the present invention were reacted with tetrahydrofuran in the presence of zinc chloride. A ratio of approximately 2 moles of tetrahydrofuran per mole of halide was used in each case. These are shown in Table II. For each example the halide used, the product prepared and the d (density), B.P. (boiling point) and n (refractive index) of the product is given.

TABLE II

| Example | Halide | Product | (d) | (B.P.), °C | (n) |
|---|---|---|---|---|---|
| 4 | 2,3-dichloro-1-propene | 2-chloroallyl 4-chlorobutyl ether | [1] 1.1100 | [2] 50 | [1] 1.4632 |
| 5 | Trans-1,3-dichloro-propene | Trans-3-chloroallyl-4-chlorobutyl ether | [3] 1.1181 | [2] 58 | [3] 1.4684 |
| 6 | Cis-1,3-dichloro-propene | Cis-3-chloroallyl 4-chlorobutyl ether | [1] 1.120 | [4] 66 | [3] 1.4670 |
| 7 | p-Methylbenzyl chloride | p-methylbenzyl 4-chlorobutyl ether | [3] 1.035 | [2] 103 | [3] 1.5080 |

[1] At 24° C.   [2] At 1 mm.   [3] At 25° C.   [4] At 2 mm.

Example 8

A mixture of 2 moles of tetrahydrofuran, 1 mole of n-propyl chloride and 12 g. of zinc chloride was heated for four hours at 175° C. The amount of n-propyl 4-chlorobutyl ether produced during this period of time was 0.093 mole. The compound has the following properties: $b_{10\,mm}$. 62° C., $d_{24}$ 0.9355 g./ml., $n_D^{24}$ 1.4255.

The chromatogram of the reaction mixture prior to recovery of the pure product showed substantially no by-products, thus indicating a low conversion.

Example 9

A mixture of 2 moles tetrahydrofuran, 1 mole of n-butyl chloride, and 8.6 g. of zinc chloride was refluxed at 71° C. for 12 days. At the end of this period the vapor phase chromatogram showed the presence of 0.016 mole of butyl 4-chlorobutyl ether in the reaction mixture and substantially no by-products.

The above reaction was repeated at a temperature of 150° C. for four hours in an autoclave. By vapor phase chromatography there was found 0.034 mole of butyl 4-chlorobutyl ether in the reaction mixture. Again substantially no by-products were observed. Properties of the purified ether were: $b_{4\,mm}$. 60° C., $d_{23}$ 0.923 g./ml., $n_D^{23}$ 1.4300.

Example 10

A mixture of 6.16 moles of tetrahydrofuran, 2.3 moles of n-butyl bromide and 26 g. of zinc chloride was refluxed for 14 days during which time the temperature rose from an initial 75° to 86°. After the unreacted starting materials were removed by fractional distillation, the residue was flash distilled and then the distillate was carefully fractionated to give 0.42 mole of butyl 4-bromobutyl ether. Properties were: $b_{1.5\,mm}$. 57° C., $d_{24}$ 1.150 g./ml., $n_D^{24}$ 1.4500.

There was also obtained as a by-product 0.19 mole of butanediol butyl 4-bromobutyl diether, the product of the reaction between the primary product and additional tetrahydrofuran. Properties were: $b_{1\,mm}$. 100–105° C., $d_{24}$ 1.090 g./ml., $n_D^{24}$ 1.4545.

In addition to those compounds previously disclosed, other compounds within the genera disclosed may be employed as starting materials, such as, for example, methyl chloride, methyl bromide, ethyl chloride, propyl bromide, amyl chloride, hexyl bromide and similar lower alkyl chlorides and bromides, 4-n-propylbenzyl chloride, 4(2-chloroethyl)benzyl chloride, 1,2-dichloro-2-butene, 1,3-dibromo-1-pentene, 2-chloro-3-hexene, 1,5-dichloro-3-hexene, 2-chloro-4-ethyl-3-hexene, and 1-chloro-2-heptene and similar chloro and bromo allyl and benzyl derivatives.

We claim:

1. A process for the preparation of haloethers having the formula A—O—(CH$_2$)$_4$—X, wherein X is a halogen selected from the group consisting of chlorine and bromine and wherein A is a radical selected from the group consisting of primary alkyl radicals having from one to six carbon atoms, and allyl and benzyl radicals having the respective formulae:

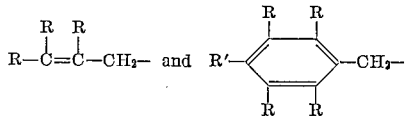

wherein R is a member selected from the group consisting of alkyl radicals having from one to three carbon atoms, bromine, chlorine and hydrogen atoms; and R' is a member selected from the group consisting of alkyl radicals having from one to three carbon atoms and chlorine and bromine atoms; which comprises reacting by contacting tetrahydrofuran with an organic halide having the formula A—X, wherein A and X have the aforesaid significance, in the presence of a catalytic amount of an inorganic Friedel-Craft catalyst at a temperature of from about 25° to about 200° C.

2. The process of claim 1 wherein the organic halide employed is a primary alkyl halide having from one to six carbon atoms.

3. The process of claim 1 wherein the organic halide employed is an allyl halide.

4. The process of claim 1 wherein the organic halide employed is a benzyl halide.

5. The process of claim 1 wherein the organic halide employed is allyl chloride.

6. The process of claim 1 wherein the organic halide employed is a dichloropropene.

7. The process of claim 1 wherein the organic halide employed is allyl bromide.

8. The process of claim 1 wherein the molar ratio of tetrahydrofuran to organic halide is from about 0.5:1 to about 10:1.

9. The process of claim 1 wherein the Friedel-Craft catalyst used is zinc chloride.

10. The process of claim 1 wherein the reaction temperature is about 50 to 175° C.

References Cited by the Examiner

UNITED STATES PATENTS 2,241,200   5/1941   Hopff _____ 260—611
2,889,380   6/1959   Hamel _____ 260—614 X
2,945,864   7/1960   Lorette _____ 260—614 X

FOREIGN PATENTS 879,343   11/1942   France.

OTHER REFERENCES

Organic Synthesis, vol. 29 (1949), pp. 30–31.

BERNARD HELFIN, *Primary Examiner.*

CHARLES B. PARKER, LEON ZITVER, *Examiners.*